United States Patent [19]  
van der Beek

[11] 3,953,088  
[45] Apr. 27, 1976

[54] DEVICE COMPRISING AN AUTOMATICALLY ALIGNING BODY OF REVOLUTION

[75] Inventor: Arnoldus Paulus Cornelius Maria van der Beek, Beekbergen, Netherlands

[73] Assignee: Ultra Centrifuge Nederland N.V., The Hague, Netherlands

[22] Filed: Oct. 18, 1974

[21] Appl. No.: 516,084

[30] Foreign Application Priority Data  
Oct. 26, 1973 Netherlands............ 7314750

[52] U.S. Cl. ................................. 308/147  
[51] Int. Cl.² ........................... F16C 23/00  
[58] Field of Search............ 308/2 R, 2 A, 139, 140, 308/146, 147, 148; 210/364, 365, 366, 367

[56] References Cited  
UNITED STATES PATENTS  
423,408    3/1890    Benjamin ................. 308/147 X  
502,859    8/1893    Pedersen .................. 308/147 X  
519,975    5/1894    Smith ...................... 308/147 X Primary Examiner—M. H. Wood, Jr.  
Assistant Examiner—Gene A. Church  
Attorney, Agent, or Firm—Stewart and Kolasch, Ltd.

[57] ABSTRACT

The invention relates to a device comprising an automatically aligning body of revolution supported from a damped pivot bearing, a housing rigidly connected with the body of revolution and filled with a damping fluid being arranged between the body of revolution and the pivot bearing, in which housing projects an adjusting body connected with the pivot and elastically connected with said housing, wherein the damping fluid has such a viscosity that it is highly viscous.

21 Claims, 6 Drawing Figures

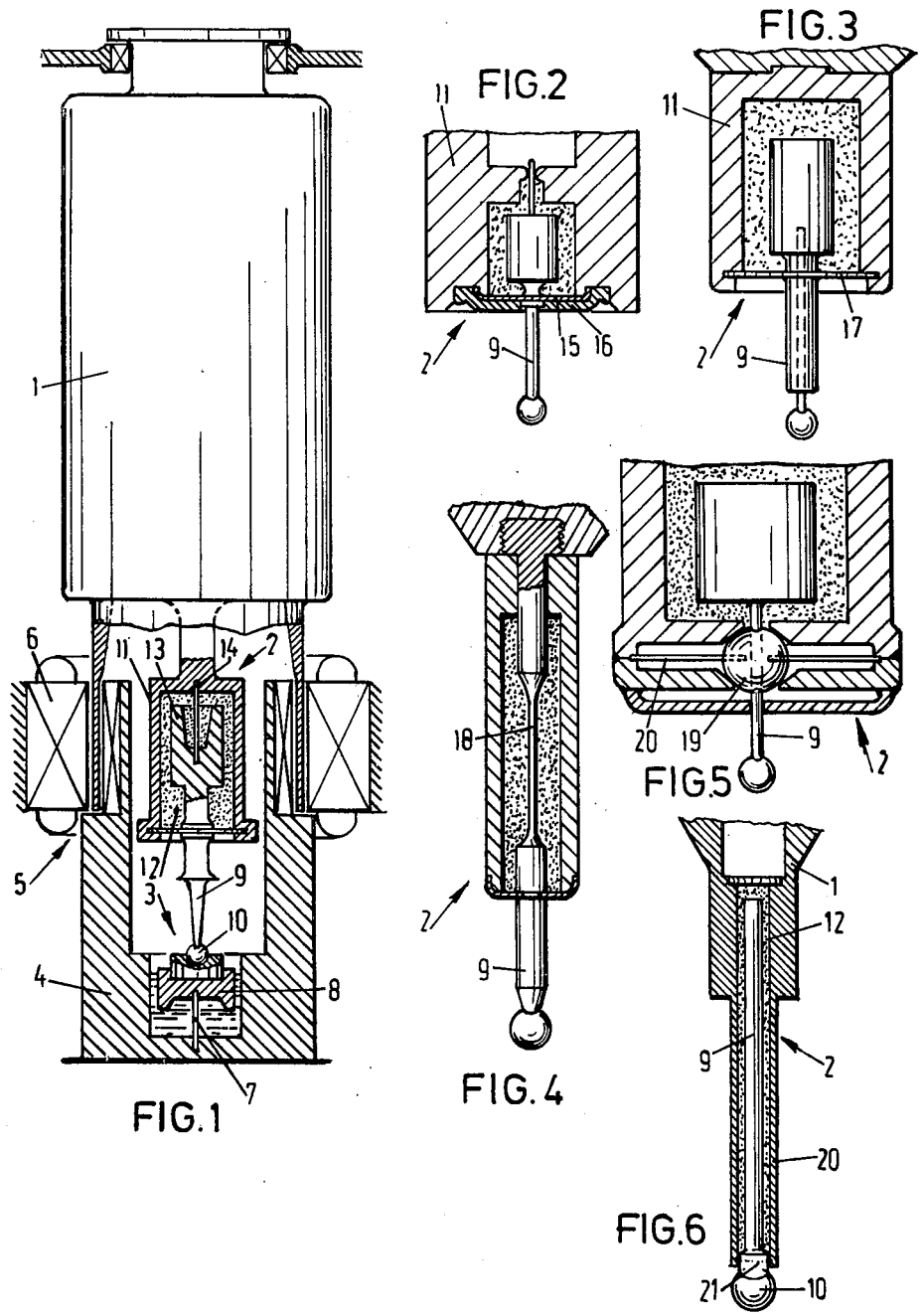

DEVICE COMPRISING AN AUTOMATICALLY ALIGNING BODY OF REVOLUTION

The invention relates to a device comprising a body of revolution controlled by a damped pivot bearing, a housing rigidly secured to the body of revolution and filled with damping fluid being arranged between the body of revolution and the pivot bearing, said housing accomodating an adjusting body connected with the pivot and being elastically joint to the housing.

The invention has for its object to provide a device of the kind set forth, in which the body of revolution after having been subjected to transient, lateral forces, realigns itself automatically.

According to the invention this is achieved by using a damping fluid of such high viscosity that it is highly viscous. Since the adjusting body is movable in the viscous fluid, the pivot will always adjust itself so that it will lie on the axis of rotation of the body of revolution. In order to avoid deflection of the pivot in the housing filled with the damping mass in the stationary state, the adjusting body may also be connected with the housing by a thin bar substantially in line with the pivot. Forces of longer duration are absorbed by the elastic connection with the housing. This elastic connection may be formed by a membrane. In some applications a heat flux frequently occurs in the direction towards the body of revolution. The viscous damping fluid tends to isolate this thermal flux. In order to avoid this isolation the membrane is coated on the side facing the pivot bearing with a flexible layer of thermally good conducting material. This layer may be of silver.

A satisfactory heat transfer may alternatively be ensured by making the housing and/or the adjusting body from a thermally good conducting material and by connecting the adjusting body with the pivot through a steel bar. The housing and the adjusting body may be of beryllium copper, whilst the pivot comprises a steel core coated with a thermally good conducting material. As an alternative a silver layer may be used instead of the membrane or the pivot may be partly made of silver or copper. The bar may furthermore form part of the adjusting body. As a further alternative the bar may form part of the adjusting body. The pivot may be mounted in the housing by means of a ball-and-socket joint.

The invention will be described more fully with reference to the accompanying drawings, which show embodiments of the invention.

FIG. 1 shows schematically the disposition of an application of an aligning device in accordance with the invention;

FIG. 2 shows the aligning device embodying the invention in further detail;

FIG. 3 shows a variant of the aligning device shown in FIG. 2;

FIG. 4 shows a further variant;

FIG. 5 shows a fourth embodiment of the invention and

FIG. 6 shows a fifth embodiment of the invention.

The body of revolution 1 bears via an aligning device 2 and a pivot bearing 3 on the bottom 4. The body of revolution 1 is driven by an electric motor 5 comprising an outward stator 6. The pivot bearing 3 is filled with a fluid and has a bearing 8 supported from a bar 7, a pivot 9 with a spherical end 10 being held in said bearing. The pivot 9 projects into the housing 11 of the aligning device according to the invention. The housing 11 contains a viscous mass 12, for example, tar or a synthetic resin having specific adhesive properties. The pivot 9 has a thickened end 13, which is connected with the housing 11 through a steel bar 14.

From FIG. 2 it will be apparent, that the pivot 9 is connected with the housing 11 through a membrane 15. On the bottom side the membrane 15 is coated with a layer of silver 16, which has good thermal conductivity.

FIG. 3 shows a variant in which the membrane of FIG. 2 is replaced by a layer of silver 17. The connecting bar between the pivot 9 and the housing 11 is omitted.

FIG. 4 shows that as an alternative the pivot and the bar connecting the pivot with the housing may form a single unit 18.

Finally, FIG. 5 shows that the connection between the pivot and the housing may be formed by a ball-and-socket joint 19. In all cases owing to the elastic connection with the housing either through a membrane 20 of steel, silver or copper or a layer of silver the pivot is capable of performing a pivotal movement with respect to the housing.

In the embodiment shown in FIG. 6 the parts corresponding to the elements of the preceding embodiments are designated by the same reference numerals. Only the annular part 21 has a metallic connection between the cylindrical part 20 and the pivot 9. The damping mass 12 is held between said parts.

What I claim is:

1. A device comprising a body of revolution supported by a pivot means in a damped pivot bearing, a housing rigidly connected with the body of revolution and disposed between said pivot means and said body of revolution, an adjusting body extending into said housing and connected at one end portion thereof to the pivot means, and elastic means for elastically connecting the adjusting body to the housing, said housing containing a highly viscous damping fluid.

2. The device of claim 1, wherein the other end portion of the adjusting body is also connected with the housing by a thin bar along the axis of the pivot means.

3. The device of claim 1, wherein a rigid bar is utilized to connect the adjusting body with the pivot means.

4. The device of claim 3, wherein the rigid bar is part of the adjusting body.

5. The device of claim 1, wherein the pivot means forms at least part of the adjusting body.

6. The device of claim 5, wherein the pivot means has an enlarged end portion which forms said adjusting body.

7. The device of claim 1, wherein the viscous damping fluid is a synthetic resin.

8. The device of claim 1, wherein the viscous damping fluid is tar.

9. The device of claim 1, wherein the elastic means is a membrane which is coated on the side thereof which faces the pivot bearing with a flexible layer of thermally conductive material.

10. The device of claim 9, wherein the thermally conductive material is selected from the group consisting of silver and copper.

11. The device of claim 1, wherein the elastic means is a layer of silver.

12. The device of claim 1, wherein the housing is made of a thermally conductive material and the adjusting body is connected with the pivot means by a steel bar.

13. The device of claim 1, wherein the adjusting body is made of a thermally conductive material and the adjusting body is connected with the pivot by a steel bar.

14. The device of claim 1, wherein the housing and the adjusting body are made of a thermally conductive material and the adjusting body is connected with the pivot by a steel bar.

15. The device of claim 12, wherein the housing is made of beryllium-copper.

16. The device of claim 13, wherein the adjusting body is made of beryllium-copper.

17. The device of claim 14, wherein both the housing and the adjusting body are made of beryllium-copper.

18. The device of claim 2, wherein said bar forms part of the adjusting body.

19. The device of claim 1, wherein the pivot means is mounted in the housing by means of a ball-and-socket joint.

20. The device of claim 1, wherein the pivot means comprises a steel core coated with a thermally conductive material.

21. The device of claim 1, wherein the pivot means is at least partially made of a material selected from the group consisting of silver and copper.

* * * * *